(12) United States Patent
Mennig et al.

(10) Patent No.: US 8,198,018 B2
(45) Date of Patent: *Jun. 12, 2012

(54) OPTICAL COMPONENT MADE OF AN INORGANIC-ORGANIC HYBRID MATERIAL FOR THE PRODUCTION OF REFRACTIVE INDEX GRADIENT LAYERS WITH HIGH LATERAL RESOLUTION AND METHOD FOR THE PRODUCTION THEREOF

(75) Inventors: Martin Mennig, Quierschied (DE); Peter William Oliveira, Saarbruecken (DE)

(73) Assignee: EPG (Engineered Nanoproducts Germany) AG, Saarbruecken (DE)

( * ) Notice: Subject to any disclaimer, the term of this patent is extended or adjusted under 35 U.S.C. 154(b) by 1200 days.

This patent is subject to a terminal disclaimer.

(21) Appl. No.: 11/721,208

(22) PCT Filed: Dec. 19, 2005

(86) PCT No.: PCT/EP2005/013685
§ 371 (c)(1),
(2), (4) Date: Oct. 24, 2007

(87) PCT Pub. No.: WO2006/066858
PCT Pub. Date: Jun. 29, 2006

(65) Prior Publication Data
US 2008/0247009 A1 Oct. 9, 2008

(30) Foreign Application Priority Data
Dec. 20, 2004 (DE) .................... 10 2004 061 323

(51) Int. Cl.
G03H 1/02 (2006.01)
(52) U.S. Cl. .................. 430/321; 430/1; 430/2
(58) Field of Classification Search .............. None
See application file for complete search history.

(56) References Cited

U.S. PATENT DOCUMENTS

| | | | |
|---|---|---|---|
| 3,650,927 A * | 3/1972 | Levinos | 522/26 |
| 3,684,516 A * | 8/1972 | Ishii | 430/283.1 |
| 4,043,819 A * | 8/1977 | Baumann | 430/283.1 |
| 4,164,422 A * | 8/1979 | Okai et al. | 430/272.1 |
| 4,173,474 A * | 11/1979 | Tanaka et al. | 430/1 |
| 4,275,143 A * | 6/1981 | Sakurai | 430/307 |
| 4,585,841 A * | 4/1986 | Eguchi et al. | 526/240 |
| 4,588,664 A * | 5/1986 | Fielding et al. | 430/1 |
| 4,696,876 A * | 9/1987 | Cael | 430/1 |
| 5,247,038 A * | 9/1993 | Fukushima et al. | 526/273 |
| 5,258,024 A | 11/1993 | Chavel et al. | |
| 5,412,016 A * | 5/1995 | Sharp | 524/430 |
| 5,529,473 A | 6/1996 | Lawton et al. | |
| 5,552,261 A | 9/1996 | Kraska et al. | |
| 5,858,526 A | 1/1999 | Floch et al. | |
| 6,236,493 B1 | 5/2001 | Schmidt et al. | |
| 6,391,286 B1 | 5/2002 | Mitra et al. | |
| 6,639,039 B1 | 10/2003 | Fries et al. | |
| 7,323,275 B2 * | 1/2008 | Otaki et al. | 430/1 |
| 7,473,721 B2 | 1/2009 | Harada et al. | |
| 2004/0071422 A1 | 4/2004 | Aylward et al. | |
| 2005/0059760 A1 | 3/2005 | Dellwo et al. | |
| 2005/0101698 A1 | 5/2005 | Harada et al. | |
| 2007/0095736 A1 * | 5/2007 | Malik et al. | 210/198.2 |
| 2008/0081264 A1 * | 4/2008 | Mennig et al. | 430/2 |

FOREIGN PATENT DOCUMENTS

| | | |
|---|---|---|
| DE | 102 00 648 | 7/2003 |
| EP | 297050 | * 12/1988 |
| EP | 302829 | * 2/1989 |
| EP | 0 324 480 A | 7/1989 |
| EP | 1 408 352 | 4/2004 |
| JP | 57-005705 | * 1/1982 |
| JP | 2004-177752 A | 6/2004 |
| WO | 97/38333 | 10/1997 |
| WO | 03/057773 A | 1/2003 |

OTHER PUBLICATIONS

Kakihana "Sol-gel preparation of high temperature superconducting oxides", J. Sol-Gel Sci. Technol., vol. 6 pp. 7-55 (1996).*
Duan et al. "Two photon polymerization of metal ions doped actylate monomers and oligomers for three dimensional structure fabrication", Thin Sol. Films., vol. 453-454 pp. 518-521 (2004).*
Girard-Reydet et al. "In situ polymerization of tetraethoxysiulane in poly(vinyl acetate)." Macromol. Chem., Phys. 149-158 (1994).*
Zhang et al. "Poly(methyl methacrylate)-titania hybrid materials by sol-gel processing", J. Mater. Sci. vol. 32, 1469-1472 (1997).*
Hackh's Chemical Dictionary, 4th Ed. (1972) cover page and p. 473.*
Snachez et al., "Tailoring of transition metal alkoxides via complexation . . . ", Mat. Reas. Soc. Symp. Proc., vol. 271 pp. 669-680 (1992).*
Oliveira et al., "Fabrication of Grin-Lenses by Contactless Electrophoretic-Gradient Formation in Transparent Nanocomposites" Organic/Inorganic Hybrid Materials II., San Francisco, CA, 1999, published in Materials Research Society Symposium Proceedings. vol. 576, 1999, pp. 421-426.
Holleman, Wiberg, Lehrbuch der Anorganischen Chemie, vol. 91-100, deGruyter, 1985, p. 970.
A. Zimmermann et al., Light Management Films Based on Nanocomposite Coatings, paper at 5th Int. Conf. Coatings on Glass, Saarbruecken, Germany, Jul. 4-8, 2004.
C.J. Brinker, G.W. Scherer, Sol-Gel Science: The Physics and Chemistry of Sol-Gel Processing, Academic Press 1990, pp. 108-115.
U.S. Appl. No. 11/721,206 to Mennig et al. filed Jun. 8, 2007.

* cited by examiner

*Primary Examiner* — Martin Angebranndt
(74) *Attorney, Agent, or Firm* — Abel Law Group, LLP

(57) ABSTRACT

An organic-inorganic hybrid material comprising (a) at least one soluble organic polymer and (b) at least one mono- or polynuclear metal complex having at least one ligand which comprises at least one photochemically and/or thermally polymerizable functional group. Also disclosed is an optical component which is made by using the hybrid material.

34 Claims, 1 Drawing Sheet

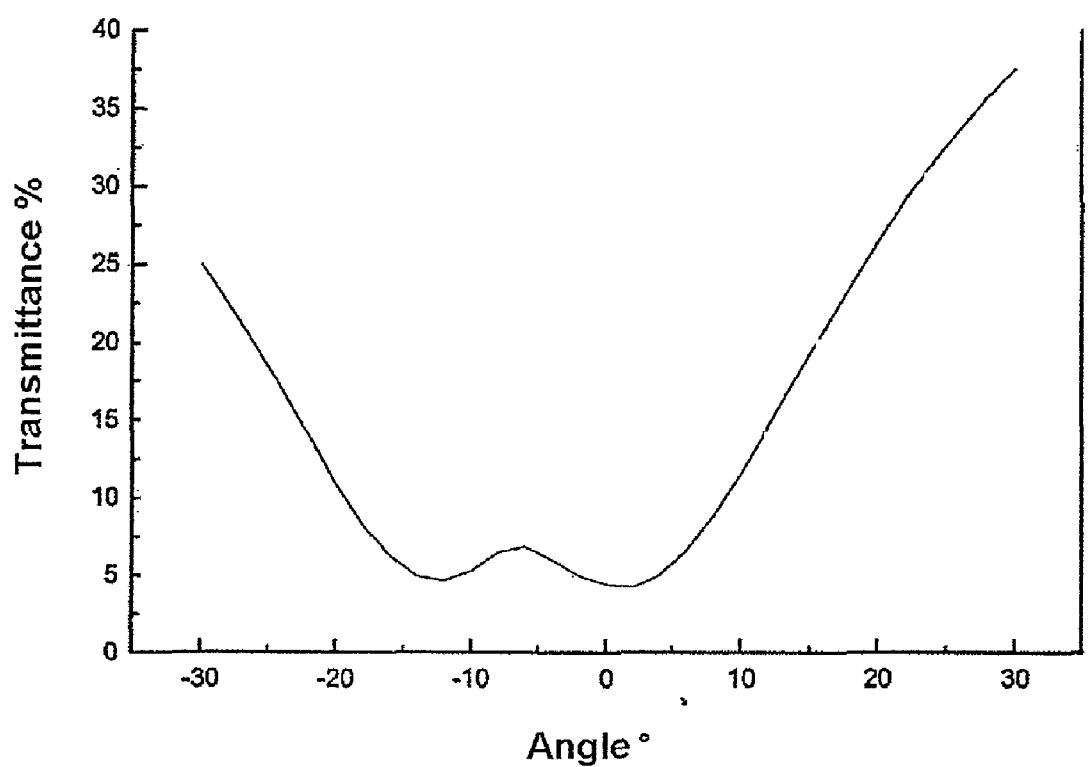

OPTICAL COMPONENT MADE OF AN INORGANIC-ORGANIC HYBRID MATERIAL FOR THE PRODUCTION OF REFRACTIVE INDEX GRADIENT LAYERS WITH HIGH LATERAL RESOLUTION AND METHOD FOR THE PRODUCTION THEREOF

CROSS-REFERENCE TO RELATED APPLICATIONS

The present application is a U.S. National Stage of International Application No. PCT/EP2005/013685, filed Dec. 19, 2005, which claims priority of German Patent Application No. 10 2004 061 323.0, filed Dec. 20, 2004.

BACKGROUND OF THE INVENTION

1. Field of the Invention

The present invention relates to optical components having refractive index gradients, to their use, to methods of producing them via organic-inorganic hybrid materials, and to said hybrid materials.

2. Discussion of Background Information

It is known that the diffusion of monomers whose refractive index is higher or else lower than that of the surrounding liquid matrix can be utilized for the production of a refractive index gradient, as described for example in U.S. Pat. Nos. 5,552,261 and 5,529,473. The Colburn-Haines effect known for photopolymers and relating to directed diffusion with subsequent polymerization in the heated or exposed areas, leads to an increase in density and hence to an increase or reduction in the refractive index (RI). In the case of organic monomers, however, this change is small, since the change in density which comes about makes only a small contribution to the molar refraction. The RI gradient profile is fixed thereafter by aftercrosslinking, by way of photopolymerization for example.

Disadvantages of these materials are relatively small RI increases, long operating times, and high scattering losses. From WO 97/38333 it is known that RI gradients can also be produced by way of the migration of nanoparticles of high or low refractive index in a liquid, photopolymerizable matrix (sol) and fixed by way of subsequent crosslinking (polymerization, condensation). The key drawback of that process is that it is tied to a liquid matrix phase. Consequently, handling problems arise with the application of holographic techniques or mask exposure techniques.

A further factor is that the RI differences in polymers, even via the Colburn-Haines effect, are relatively small, owing to the physical properties of the material. Other studies describe the diffusion of nanoparticles in incompletely compacted polymer matrices under the influence of gradient-forming measures, such as, for example, A. Zimmermann et al., Light-Management Films Based on Nanocomposite Coatings, paper at 5th Int. Conf. Coatings on Glass, Saarbrücken, Germany, 4 to 8 Jul. 2004. The RI difference is achieved by concentrating relatively high-RI inorganic nanoparticles. A drawback of that process is that the diffusion rate of the particles is smaller by one or more orders of magnitude than that of organic monomers, and the operation necessarily entails the presence of hydrolysable or hydrolysed silanes. These silanes give the materials a relatively high moisture sensitivity (e.g. C. J. Brinker, G. W. Scherer, Sol-Gel Science: The Physics and Chemistry of Sol-Gel Processing, Academic Press 1990).

DE-A-10200648 describes a process for producing holographic films and diffuser films, in which nanoparticles in conjunction with hydrolysable or hydrolysed silanes are vital to the production of holographic structures. These compounds and their preparation each exhibit the drawbacks referred to above. Condensation of the silanes may also lead to three-dimensional crosslinking and hence to the embrittlement of the material.

It is an object of the present invention, therefore, to develop a material capable of building up a sufficiently high RI gradient by application of external fields or use of gradient-forming measures, which does not have the aforementioned drawbacks.

It has now surprisingly been found that this object can be accomplished by means of a polymer which forms a solid or viscous matrix and in which certain metal complex compounds are dispersed or dissolved, without the need for silanes or nanoparticles.

SUMMARY OF THE INVENTION

The present invention provides an organic-inorganic hybrid material comprising (a) at least one soluble organic polymer and (b) at least one mono- or polynuclear metal complex having at least one ligand which comprises at least one photochemically and/or thermally polymerizable functional group.

In one aspect, the hybrid material may further comprise at least one component selected from solvents, organic monomers, organic oligomers, and plasticizers.

In another aspect, the material may comprise, based on the total dry weight thereof,
(a) from 4.9% to 95.9% by weight, e.g., from 10% to 80% by weight or from 20% to 40% by weight of at least one soluble organic polymer,
(b) from 0.5% to 50% by weight of at least one mono- or polynuclear metal complex having at least one ligand which comprises at least one photochemically and/or thermally polymerizable functional group,
(c) from 0% to 50% by weight, e.g., from 0.1% to 30% by weight or from 1% to 20% by weight of one or more plasticizers,
(d) from 0% to 5% by weight, of at least one additive selected from one or more of thermal and/or photochemical polymerization or crosslinking initiators, sensitizers, wetting aids, adhesion promoters, antioxidants, flow control agents, stabilizers, dyes, and photochromic or thermochromic compounds, e.g., up to 5% by weight of at least one substance selected from thermal and/or photochemical polymerization or crosslinking initiators,
(e) from 0% to 4.9% by weight of organic monomers
(f) from 0% to 50% by weight of organic oligomers.

In another aspect, the hybrid material may be solid or viscous.

In yet another aspect, the hybrid material may comprise the above component (e) which may comprise an acrylate and/or may comprise the above component (f) which may comprise an oligomer of an acrylate. For example, the acrylate may comprise one or more of methyl methacrylate, a diol diacrylate and a diol dimethacrylate.

In a still further aspect of the hybrid material of the present invention, the at least one soluble polymer may comprise one or more of a polyacrylate, a polymethacrylate, a polyepoxide, polyvinyl alcohol, polyvinyl acetate, polyvinyl butyral and polyacrylamide and/or the at least one mono- or polynuclear metal complex may comprise at least one alkoxide group on a central metal atom thereof.

In another aspect of the hybrid material, the at least one ligand may be selected from carboxylic acids, β-diketones, CH-acidic compounds, chelate ligands, amino acids, peptides and proteins and corresponding bases thereof, each of which contain at least one group which is photochemically and/or thermally polymerizable.

In another aspect, the at least one functional group which is photochemically and/or thermally polymerizable may be selected from C=C double bonds, hydroxyl, epoxy and amino groups.

In another aspect of the hybrid material, the at least one ligand may comprise at least one photochemically polymerizable functional group.

The present invention also provides an organic-inorganic hybrid material which comprises, based on the total dry weight thereof,
(a) from 20% to 40% by weight of at least one soluble organic polymer which comprises one or more of a polyacrylate, a polymethacrylate, a polyepoxide, polyvinyl alcohol, polyvinyl acetate, polyvinyl butyral and polyacrylamide,
(b) from 0.5% to 50% by weight of at least one mono- or polynuclear metal complex having at least one ligand which comprises at least one functional group which is at least photochemically polymerizable,
(c) from 1% to 20% by weight of one or more plasticizers,
(d) up to 5% by weight of at least one additive selected from one or more of thermal or photochemical polymerization or crosslinking initiators, sensitizers, wetting aids, adhesion promoters, antioxidants, flow control agents, stabilizers, dyes, and photochromic or thermochromic compounds,
(e) from 0% to 4.9% by weight of organic monomers which comprise one or more of methyl methacrylate, a diol diacrylate and a diol dimethacrylate
(f) from 0% to 50% by weight of organic oligomers derived from one or more of methyl methacrylate, a diol diacrylate and a diol dimethacrylate.

In one aspect of this hybrid material, the at least one mono- or polynuclear metal complex may comprise at least one alkoxide group on a central metal atom thereof.

In another aspect, the at least one ligand may be selected from carboxylic acids, β-diketones, CH-acidic compounds, chelate ligands, amino acids, peptides and proteins and corresponding bases thereof, each of which contain at least one group which is at least photochemically polymerizable.

The present invention also provides a method of producing an optical component. The method comprises
(a) applying a hybrid material of the present invention as set forth above, including the various aspects thereof, to a substrate or placing the hybrid material into or onto a mould,
(b) optionally, drying the hybrid material to render it solid or viscous,
(c) patternwise heating or irradiating the solid or viscous hybrid material to produce a refractive index gradient in the hybrid material, and
(d) thermally and/or photochemically curing the heated or irradiated hybrid material substantially completely to fix the refractive index gradient.

In one aspect of the method, step (c) may be carried out at a temperature of from 30 to 90° C., e.g., at a temperature of from 50 to 70° C.

In another aspect, the hybrid material may be applied to a transparent polymeric film and, if desired, a transparent liner film may be laminated onto the undried or dried hybrid layer.

In yet another aspect, step (c) may comprise a patternwise irradiation by means of at least one of holography, lithography and local irradiation.

In a still further aspect, a refractive index gradient may be produced in the hybrid material perpendicularly to the direction of irradiation.

In another aspect of the method, a local irradiation of the hybrid material may produce a refractive index gradient perpendicularly to the direction of irradiation.

In another aspect, the method may further comprise a delamination of the substantially completely cured hybrid layer from the substrate to afford the hybrid layer in the form of a film or sheet.

The present invention also provides an optical component which is obtainable by a method which comprises
(a) applying a hybrid material according to the present invention as set forth above, including the various aspects thereof, to a substrate or placing a hybrid material into or onto a mould,
(b) optionally, drying the hybrid material to render it solid or viscous,
(c) patternwise heating or irradiating the solid or viscous hybrid material to produce a refractive index gradient in the hybrid material, and
(d) thermally and/or photochemically curing the heated or irradiated hybrid material substantially completely to fix the refractive index gradient.

In one aspect, the optical component may be present as a coated substrate or a moulding.

For example, it may be present as a film.

In another aspect, the optical component may comprise a transparent or translucent hybrid layer with refractive index gradients. For example, the optical component may be present as a refractive index gradient film. The refractive index gradient film may, for example, comprise or substantially consist of one or more transparent polymeric films coated with a hybrid material which comprises a refractive index gradient.

The present invention also provides an imaging optical element, a light-guiding optical component and a holographic data storage, all of which comprise the optical component of the present invention as set forth above, including the various aspects thereof.

BRIEF DESCRIPTION OF THE DRAWINGS

In the only Drawing,
FIG. 1 shows the gain profile of the diffuser of Example 9.

DETAILED DESCRIPTION OF THE INVENTION

The invention accordingly provides an organic-inorganic hybrid material comprising a) a soluble organic polymer and b) a mono- or polynuclear metal complex having at least one ligand containing at least one photochemically or thermally polymerizable functional group.

The invention further provides a method of producing an optical component, characterized in that a) an organic-inorganic hybrid material of the invention is applied to a substrate or placed into or onto a mould, b) the hybrid material is dried if desired so that it becomes solid or viscous, c) the solid or viscous hybrid material is heated patternwise or preferably irradiated patternwise in order to produce a refractive index gradient in the hybrid material, and d) the hybrid material is subsequently fully cured thermally and/or photochemically, thereby fixing the refractive index gradient.

Besides the soluble organic polymer and the metal complex the hybrid material of the invention may further comprise solvents, organic monomers or oligomers, plasticizers and/or other additives.

The organic-inorganic hybrid material preferably comprises, accordingly, based on the total dry weight:
a) 4.9% to 95.9%, preferably 10% to 80%, in particular 20% to 40% by weight of a soluble polymer,
b) 0.5% to 50% by weight of a mono- or polynuclear metal complex having at least one ligand containing at least one photochemically or thermally polymerizable functional group,
c) 0 to 50%, preferably 0.1% to 30%, more preferably 1% to 20% by weight of a commercially customary plasticizer,
d) 0 to 5% by weight, preferably 0.01% to 1% by weight, of one or more additives, preferably selected from thermal or photochemical polymerization or crosslinking initiators, sensitizers, wetting aids, adhesion promoters, antioxidants, flow control agents, stabilizers, dyes, photochromic or thermochromic compounds, and
e) 0 to 4.9% by weight of organic monomers and/or 0 to 50% by weight of organic oligomers.

The total dry weight refers to the total weight of the hybrid material without solvents. Components a) to e) preferably account for 100% by weight of the total dry weight; in other words, apart from these components and the optional solvent, the hybrid material preferably contains no further components. It is particularly preferred for the hybrid material not to contain any hydrolysable or hydrolysed silanes and also not to contain any condensation products thereof (both partly and fully condensed silanes).

It is also preferred that no nanoparticles are added to the hybrid material.

Suitable soluble polymers include all of the conventional soluble organic polymers, and mixtures of soluble polymers can be used as well. Particularly preferred are polymers which are soluble in organic solvents, for instance, in alcohols, such as ethanol, isopropanol or butanol, ketones, such as acetone, esters, such as ethyl acetate, ethers such as tetrahydrofuran and glycols, such as ethylene glycol, and aliphatic, aromatic and halogenated hydrocarbons, such as hexane, benzene, toluene and chloroform. Examples of such soluble polymers are acrylates, such as polyacrylate, polymethacrylate, polyepoxide, polyvinyl alcohol, polyvinyl acetate, polyvinyl butyral and polyacrylamide. As soluble polymer, such polymers may, for example, be used which have a solubility of at least 20 g/l at 20° C. in the solvent employed.

The mono- or polynuclear metal complexes used in accordance with the invention are complexes of metals, with one or more central metal atoms. For the complex it is possible to use any metals, examples being metals from main groups two to six, preferably two to five, of the Periodic Table of the Elements or from transition groups one to eight of the Periodic Table of the Elements, or the transition metals, including the lanthanoids and actinoids. Preference is given to Zn, Ti, Zr, Ce, Sn, La, Fe, Ta, Hf, Nb, Al, Cu, V, M, W, Ag and Cu, particular preference to Ti, Zr, Ta and Nb. Semimetals such as Si, B or As are not metals.

Besides the ligand or ligands which contain the photochemically or thermally polymerizable group the complexes may preferably comprise further typical groups as complex ligands. These complex ligands are known to the skilled person. Examples of such further ligands are alkoxides, preferably $C_{1-6}$ alkoxides, phenoxy, halides (F, Cl, Br, I), oxo and amine. Examples of organic ligands are carboxylic acids, β-diketones, such as acetoacetates or acetylacetonates, CH-acidic compounds, chelate ligands, having for example one or more amino, oxo and/or hydroxyl groups, such as EDTA or ethylenediamine, amino acids, peptides and proteins or corresponding bases of these compounds. The corresponding base of carboxylic acid, for example, is a carboxylate compound, such as the acetate anion. Further examples of ligands are given for example in Holleman, Wiberg, Lehrbuch derAnorganischen Chemie, vol. 91-100, deGruyter, 1985, p. 970.

The ligands containing the thermally or photochemically polymerizable functional group may be an organic ligand, particularly one of the examples given above of organic ligands, which additionally contains at least one photochemically or thermally polymerizable functional group. These ligands are commonly difunctional compounds, having a functional group for attachment to the metal, and the polymerizable group. The polymerizable groups are reactive groups which are able, with themselves or with other groups, to enter into linking reactions which may be initiated photochemically or thermally. Polymerization and polymerizable here also include polycondensation and polycondensable, and polyaddition and polyadditionable, and encompass crosslinking reactions and curing reactions as well. The polymerizable groups are known to the skilled worker.

Examples of polymerizable groups are C=C double bonds, OH groups, epoxy groups, amino groups or other groups which can be linked to one another chemically, it being possible for the formation of this link to be initiated photochemically or thermally. The linking involved may be that of different groups with one another. In that case use is made in each case, as the metal complex, of complexes containing the different groups, in order to ensure linking. Preference is given to photochemically or thermally polymerizable groups which possess a (meth)acryloyl, allyl, vinyl or epoxy group, particular preference being given to (meth)acryloyl groups and epoxy groups. Amino groups are also suitable as thermally or photochemically polymerizable groups, and are able to enter into condensations with, for example, epoxide groups, OH groups or acid chlorides. Particular preference is given in this context to primary monoamino groups. Photochemically polymerizable groups are preferred.

A preferred ligand containing no polymerizable group is alkoxide. The metal complexes are therefore obtained preferably from the reaction of typical metal alkoxides with the ligand containing the photochemically or thermally-polymerizable functional group and, if desired, further ligands. The metal complexes are preferably able to form, by further reaction, chalcogenides, sulphides, halides or metals. For example, the metal complexes may be converted by hydrolysis or acidolysis to chalcogenides or halides. The metal complexes are preferably complexes with ligands having double bonds or other photochemically or thermally crosslinkable organic groups which are coupled via known coupling groups (e.g. groups forming complex bonds) to the central atoms of the complex-forming metal and which do not contain silanes.

Suitable plasticizers include in principle all commercially customary compounds, in accordance for example with DIN 55945 (December 1988). Preference is given to plasticizers selected from the group of acyclic aliphatic dicarboxylic esters, examples being esters of adipic acid, such as di-n-octyl adipate, bis(2-ethylhexyl) adipate, diisodecyl adipate, dibutyl sebacate, dioctyl sebacate and bis(2-ethylhexyl) sebacate; esters of $C_6$-$C_{12}$ dicarboxylic acids with polyalkylene glycols, examples being triethylene glycol bis(n-heptanoate), triethylene glycol bis(2-ethylhexanoate) and triethylene glycol bis(isononanoate); esters of $C_6$-$C_{12}$ carboxylic acids with polyalkylene glycols, an example being triethylene glycol bis(2-ethylbutyrate); diesters of (meth)acrylic acid and polyalkylene glycols, such as polypropylene glycol diacrylate or dimethacrylate, polyethylene glycol diacrylate or dimethacrylate, an example being tetraethylene glycol di(meth)acrylate.

The hybrid material may further comprise other additives (component d)), preferably selected from thermal or photochemical crosslinking initiators, sensitizers, wetting aids, adhesion promoters, antioxidants, flow control agents, stabilizers, dyes, photochromic and thermochromic compounds or a combination thereof.

The hybrid material advantageously includes a polymerization catalyst (including polyaddition catalysts and/or polycondensation catalysts) which is able to induce crosslinking and curing thermally and/or photochemically ("polymerization or crosslinking initiator"). Examples of photoinitiators which can be used are the initiators available commercially. Examples of these are Irgacure® 184 (1-hydroxycyclohexyl phenyl ketone), Irgacure® 500 (1-hydroxycyclohexyl phenyl ketone, benzophenone) and other photoinitiators of the Irgacure® type; Darocur® 1173, 1116, 1398, 1174 and 1020, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone. It is also possible to use photoinitiators and complementary sensitizers which are excited, for example, by visible light.

Suitable thermal initiators preferably include organic peroxides in the form of diacylperoxides, peroxydicarbonates, alkyl peresters, dialkyl peroxides, perketals, ketone peroxides and alkyl hydroperoxides. Examples of thermal initiators of this kind are dibenzoyl peroxide, tert-butyl perbenzoate and azobisisobutyronitrile. One example of a cationic thermoinitiator is 1-methylimidazole. Examples of flow control agents are polyether-modified dimethylpolysiloxanes, such as Byk 306®. Examples of sensitizers are amine-modified oligoether acrylates, such as Crodamers®.

Organic monomers and/or oligomers used are, in particular, those which are soluble in the solvent used. Suitable monomers or oligomers include preferably all organic compounds which carry the polymerizable or crosslinkable functional groups specified under b). Preference is given to using monomers and/or oligomers having photochemically polymerizable or crosslinkable groups. These can be polymerized or crosslinked with the aid of the photochemical or thermal initiators specified in connection with component d). The amount, based on the total dry weight, is for example 0 to 54.9% by weight of organic monomers and/or oligomers, preference being given to 0 to 4.9% by weight of monomers and/or 0 to 50% by weight of oligomers.

Preferred examples of these monomers and/or oligomers are acrylates, preferably methyl methacrylates. It is, however, also possible to use diacrylates, for example, such as diol diacrylates or diol dimethacrylates, hexanediol dimethacrylate, hexanediol diacrylate, dodecanediol diacrylate or dodecanediol dimethacrylate.

The hybrid material is generally produced using a solvent. The amount of solvent used in the hybrid material depends on the intended use. In this way the hybrid material serves as a coating composition or moulding compound. Suitable solvents include all typical solvents with which the soluble polymers can be dissolved. Preference is given to organic solvents and water. Mixtures of solvents can be used as well. Examples of organic solvents are alcohols, such as ethanol, isopropanol or butanol, ketones, such as acetone, esters such as ethyl acetate, ethers such as tetrahydrofuran and glycols, such as ethylene glycol, and aliphatic, aromatic and halogenated hydrocarbons, such as hexane, benzene, toluene and chloroform.

The hybrid material is a matrix-forming material and is outstandingly suitable for producing mouldings or coatings having an RI gradient. Accordingly the invention also provides methods of producing such layers and mouldings having RI gradients, and the articles obtained as a result. In the text below, the method is described with reference to coatings. For the production of mouldings, the same comments apply, mutates mutandes, with mouldings being otherwise formable by the typical moulding processes: for example, by introduction into a mould or application to a mould, and removal from the mould after curing. The appropriate processes also include film casting.

In one particularly preferred embodiment a substrate, preferably a backing film, made of polymeric material for example, is coated with the hybrid material as elucidated below, and, after curing, the coating formed is detached (delaminated) from the substrate, giving a self-supporting film or sheet as an optical component having an RI gradient.

The method of producing layers having RI gradients includes the application of hybrid material to a substrate. Any suitable substrate can be used, preferably glass or polymeric substrates, such as polymeric sheets or polymer films. The substrate is preferably transparent. To produce an RI gradient material the polymerizable hybrid material is applied preferably to a transparent substrate, more preferably to transparent polymeric films, especially PET, PE, PP, TAC or PC.

Coating with the hybrid material may take place in accordance with typical methods, such as by dipping, flooding, knifecoating, pouring, spincoating, injecting, brushing, slot coating, meniscus coating, film casting, roller application, printing, flexographic printing for example, or spraying. The particular viscosity required can be set via the amount of solvent used, via the identity of the polymer or, if desired, via the identity and amount of the monomer and/or oligomer. Preferred layer thicknesses (in the dried or cured state) are between 1 to 100 μm.

The RI (refractive index) gradients are produced by a concentration gradient of the inorganic material in the hybrid material, brought about by zones of inorganically enriched materials of high refractive index. The concentration gradient and hence the RI gradient can be produced by means of any desired gradient-forming measure. The gradient-forming measure is preferably performed on a hybrid material which is solid or viscous. For the gradient-forming measure the hybrid material may have, for example, a viscosity at 25° C. of 2 to 3500 Pas, preferably 500 to 2000 Pas. This can be set, for example, by means of complete or partial removal of the solvent.

Through the gradient-forming measure a potential difference is generated as a driving force for the directed diffusion of the polymerizable metal complexes via differences in chemical potential (in the concentration of chemical compounds or chemical groups), in the same way, for example, as with the above-described Colburn-Haines effect.

The gradient-forming measure is in particular a local or patternwise irradiation or heating of the hybrid layer for the purpose of producing targeted local photochemical or thermal initiation of polymerization which leads to the formation of the concentration gradient. Preference is given to holography, for example two-wave mixing, lithography or local irradiation or exposure as the gradient-forming measure. It is preferred to use laser light, UV light or visible light. The patternwise irradiation may if desired be performed at an elevated temperature of 30 to 90° C. and preferably 50 to 70° C.

Under the influence of the gradient-forming measures, for example a local exposure, and in the presence of a crosslinking initiator, the freely diffusing metal complexes undergo crosslinking or polymerization via the linking of the polymerizable or crosslinkable ligands and hence form local zones having increased refractive indices. It is also possible here for new inorganic bonds to be formed, such as oxidic, sulphidic or metallic bonds, for example, which may likewise contribute to increasing the RI. In this way the concentration gradient is produced.

Preference is given to a coating material comprising the hybrid material which is applied to transparent polymeric films and in which it is possible to produce optical structures having RI gradients, via holography, lithography or local exposure, for example, and to a method of producing a film, in which the hybrid material of the invention is applied by wet-chemical methods to a transparent polymeric film and the solvent is substantially removed by drying, for example to a residual content of 0 to 20% by weight, in particular 0 to 10% by weight, based on the total weight of the hybrid material. In this form, or delaminated from the substrate, the film can be stored as a wound article. In order to prevent unwanted subsequent reactions the film, as is usual in the case of materials sensitive to light, is packaged in a light-protected manner and kept under controlled conditions (15 to 30° C.).

By means of patternwise irradiation, such as by holography, lithography or local exposure, a refractive index gradient is produced, as described, in the hybrid layer. By means of the transport operation, induced by the thermal diffusion, of the complex molecules which carry crosslinkable bonds, these molecules pass into the area of local exposure, and crosslink at that point with one another or with crosslinkable matrix components. As a result of the relatively high-RI inorganic fractions provided by the composition, the components form relatively high RI regions at the exposed point. In contrast to this, regions with a lower RI remain in the unexposed adjacent zones. Further complex molecules diffuse from this adjacent zone into the exposed zone. This operation, with the directed diffusion, takes place in the course of exposure and lasts in general for between about one to a few seconds and a few minutes, depending on exposure conditions and temperature. The difference in RI between the relatively high-RI and low-RI regions produces a local RI gradient.

Surprisingly the migration of the linkable or polymerizable/crosslinkable complexes in the hybrid material takes place even when the hybrid material or the matrix is solid or viscous.

This operation is followed by the complete crosslinking of the hybrid material (the matrix) which still contains components having as yet uncrosslinked groups, crosslinking taking place preferably by areal photopolymerization and/or by thermally initiated polymerization, accompanied by fixation of the gradient formed. Any residual solvent still present is removed during this operation (stabilization of the layer). Irradiation with UV light or visible light is preferred for complete curing of the hybrid material and accompanying fixation of the gradient.

The described stabilization of the layer containing the RI gradient is accomplished preferably via areal exposure, those polymerizable groups which have not diffused into the regions of relatively high RI crosslinking with one another and thereby stabilizing the total layer area. In the course of this process the double bonds or other polymerizable groups undergo conversion to the corresponding single bonds.

The degree of conversion expresses the extent of the polymerization reaction of the reactive groups—C=C double bonds or epoxy groups, for example—present in the complex ligands or in the matrix (organic components). An organic degree of conversion of 95%, for example, means that 95% of all the C=C double bonds or epoxy groups have undergone reaction. For determining the degree of conversion there are a variety of measurement methods in the technical literature, examples being infrared measurement methods. The polymerization can be initiated by means of customary initiators, thermally or by means of UV light. Initiators of this kind have been specified above.

The coated substrates and mouldings with RI gradients that are produced by the method of the invention can be used for transparent or translucent layers with refractive index gradients, especially for holographically and photolithographically produced gradient index lenses, holographic images, light-guide components and components in imaging optics.

The RI gradient material of the invention can be used, for example, for producing passive waveguide elements for displays and lighting elements, optical data storage media, for security holograms, picture holograms, digital holograms for information storage, for systems with components which process light wavefronts, for applications as planar waveguides (optical waveguides), for applications for polarizational influencing of light, for applications as beam splitters and as lenses.

In the examples that follow, the parameter determined as a measure of the refractive index modulation achieved is the diffraction efficiency or else what is called the "gain profile". In this case the direct transmittance of a hybrid material applied to a substrate, following migration of the crosslinkable, relatively high-RI components and complete curing of the matrix (fixing of the RI gradient), is measured at an angle of inclination of between −30° and +30° relative to the optical axis, using a hazemeter.

EXAMPLES

Example 1

Production of Photohybrid (PH) for Holography

Preparation of Zr Complex (Zr/Methacrylic Acid Complex; Zr/MAA)

187.2 g (0.40 mol) of $Zr(OPr)_4$ (82% in butanol) were charged to a 500 ml three-necked flask and cooled in an ice bath. 34.44 g (0.40 mol) of methacrylic acid were added slowly with stirring. Subsequently the reaction mixture was warmed to 25° C. and stirred for 15 minutes.

Preparation of Polymer Solution 250 g PVAc pellets were added to 1000 g of butyl acetate and the mixture was stirred at 80° C. for 16 hours. Following the addition of 100 g of Ebecryl® 150 (methacrylate-modified bisphenol A) the reaction mixture was stirred at 25° C. for a further 10 minutes until it became clear. Subsequently 150 g of Ultramol M® (adipic ester derivatives) were added and the mixture was stirred at 25° C. for 20 minutes.

Preparation of Coating Solution

Then 22.27 g of the Zr/MAA prepared were added slowly with stirring to the polymer solution. Complete addition was followed by stirring at 25° C. for 10 minutes. Stirring was followed by addition of 1% by weight (based on solids) of photoinitiator (Irgacure 2020®).

Example 2

Preparation of Ti Complex (Ti/Diketonate Complex)

A 250 ml three-necked flask was charged with 68 g (0.20 mol) of tetrabutyl orthotitanate (98% by weight in butanol, Ti) and cooled in an ice bath. 48.24 g (0.20 mol) of acetoacetoxyethyl methacrylate (AAEM) were slowly (15 minutes) added dropwise with stirring. Following complete addition the reaction mixture was removed from the ice bath after 30 minutes and then stirred at 25° C.

Preparation of the Coating Solution

The polymer solution as in Example 1 was admixed slowly with 17 g of Ti/AAEM with stirring. Complete addition was followed by stirring at 25° C. for 10 minutes. Stirring was followed by addition of 1% by weight/solids of the photoinitiator H-Nu470x.

Example 3

Preparation of Ta Complex (Ta/Diketonate Complex)

A 250 ml three-necked flask was charged with 90.28 g (0.20 mol) of tantalum ethoxide (90% by weight in ethanol, Ta) and cooled in an ice bath. 48.24 g (0.20 mol) of acetoacetoxyethyl methacrylate (AAEM) were slowly (15 minutes) added dropwise with stirring. Following complete addition the reaction mixture was removed from the ice bath after 30 minutes and then stirred at 25° C.

Preparation of the Coating Solution

The polymer solution as in Example 1 was admixed slowly with 20.31 g of Ta/AAEM with stirring. Complete addition was followed by stirring at 25° C. for 10 minutes. Stirring was followed by addition of 1% by weight (based on the solids) of the photoinitiator Irgacure 651®.

Example 4

Production of PH Layer on Polymeric Film

Atop a transparent PET film a layer 100 µm thick was applied by the knifecoating method. The layer was dried at 120° C. The dry layer thickness is 50 µm.

Example 5

Production of PH Layer on Glass

The coating solution was knifecoated onto a flat glass substrate measuring 10 cm×10 cm and was dried in a forced-air drying oven at 120° C. for 15 minutes. The layer thickness thereafter was approximately 50 µm. The layer was subsequently lined with a transparent PET film.

Example 6

Production of Interference Gratings at λ=315 nm

By means of two-wave mixing, phase-modulated volume holograms are generated, both as transmission holograms and as reflection holograms. The coherent light source used is an argon ion laser. The laser beam (14 mW/cm$^2$) is focused to a diameter of approximately 0.5 mm and divided by a beam splitter into two component beams of equal intensity. The interference of these two beams leads to a spatially periodic change in the light intensity. For layer production, the photohybrid from Example 1 was applied to a glass substrate (10 cm×10 cm) as in Example 5 and the interfering laser beam was directed onto the photohybrid. A grating structure is built up whose periodicity is the same as that of the intensity modulations generated by the two-wave mixing. The refractive index profile was fixed photochemically by means of the areal post-exposure of the photohybrid, with one of the write beams used in the experiment being shielded off and the remaining beam being used for afterpolymerization. In this way, volume holograms having diffraction efficiencies of 65% (at 633 nm) are produced.

Example 7

Production of Interference Gratings at λ=488 nm

The two-wave mixing experiment was carried out as in Example 4. The coherent light source used was an argon ion laser at 65 mW/cm$^2$, calibrated to 488 nm. The holographic material used was the photohybrid of Example 2. For layer production, the photohybrid was applied to a glass substrate as in Example 5. Exposure and fixation took place in the same way as in Example 6. In this way, volume holograms having diffraction efficiencies of 45% (at 633 nm) were produced.

Example 8

Production of Interference Gratings at λ=244 nm

The two-wave mixing experiment was carried out as in Example 4. The coherent light source used was an argon ion laser at 65 mW/cm$^2$ (at 488 nm) and a laser frequency doubler (initial intensity=10 mW/cm$^2$). The holographic material used was the photohybrid of Example 3. For layer production, the photohybrid was applied to a glass substrate as in Example 5. Exposure and fixation took place in the same way as in Example 6. In this way, volume holograms having diffraction efficiencies of 82% (at 633 nm) were produced.

Example 9

Production of a Diffuser by Contact Lithography

For this purpose the coating solution from Example 1 is laminated onto polymeric film as in Example 4 and covered in hard contact with a stochastic microperforation mask (integral optical density 0.55). This sandwich arrangement was exposed to parallel UV light (high-pressure Hg lamp, output 500 W) at 60° C. for 3 minutes at an angle of 5°. The refractive index gradient produced was fixed by five-minute exposure of the reverse face with homogeneous, non-parallel UV light (1200 W). Subsequently the mask was removed. The gain profile obtained is shown in FIG. 1. The profile apparent is that of an asymmetric diffuser with a local transmittance maximum at 5°.

What is claimed is:

1. A method of producing an optical component, wherein the method comprises:
   (a) applying an organic-inorganic hybrid material to a substrate or placing the organic-inorganic hybrid material into or onto a mold,
   (b) optionally, drying the hybrid material to render it solid or viscous,
   (c) patternwise irradiating by holography the solid or viscous hybrid material to produce a refractive index gradient in the hybrid material, and
   (d) thermally and/or photochemically curing the heated or irradiated hybrid material substantially completely to fix the refractive index gradient;
   the organic-inorganic hybrid material comprising:
      (i) at least one organic polymer selected from one or more of a polyacrylate, a polymethacrylate, a polyepoxide, polyvinyl alcohol, polyvinyl acetate, polyvinyl butyral, and polyacrylamide and having a solubility in an organic solvent of at least 20 g/L at 20° C., and (ii) one or more mono- or polynuclear metal complexes comprising at least one alkoxide group on a central metal thereof and further having at least one ligand that (i) is selected from carboxylic acids, β-diketones, CH-acidic compounds, chelate ligands, amino acids, peptides, proteins, and corresponding bases thereof, and (ii) comprises at least one group which is at least one of photochemically and thermally polymerizable, the central metal comprising at least one of Ti, Zr, Ta, and Nb, provided that the hybrid material does not comprise any hydrolyzable or hydrolyzed silanes or any condensation products thereof, the method further comprising at least one of a hydrolysis and an acidolysis of alkoxide groups of the one or more metal complexes (ii) with formation of oxidic bonds to increase the refractive index gradient produced in (c).

2. The method of claim 1, wherein the hybrid material further comprises at least one component selected from solvents, organic monomers, organic oligomers, and plasticizers.

3. The method of claim 1, wherein the hybrid material comprises, based on a total dry weight thereof,
(i) from 4.9% to 95.9% by weight of the at least one organic polymer,
(ii) from 0.5% to 50% by weight of the one or more mono- or polynuclear metal complexes,
(iii) from 0% to 50% by weight of one or more plasticizers,
(iv) from 0% to 5% by weight of at least one additive selected from one or more of thermal or photochemical polymerization or crosslinking initiators, sensitizers, wetting aids, adhesion promoters, antioxidants, flow control agents, stabilizers, dyes, and photochromic or thermochromic compounds,
(v) from 0% to 4.9% by weight of organic monomers, and
(vi) from 0% to 50% by weight of organic oligomers.

4. The method of claim 3, wherein the material comprises at least one of component (v) that comprises an acrylate, and component (vi) that comprises an oligomer of an acrylate.

5. The method of claim 4, wherein the acrylate comprises one or more of methyl methacrylate, a diol diacrylate and a diol dimethacrylate.

6. The method of claim 3, wherein the hybrid material comprises from 10% to 80% by weight of component (i).

7. The method of claim 6, wherein the hybrid material comprises from 20% to 40% by weight of component (i).

8. The method of claim 7, wherein the hybrid material comprises from 1% to 20% by weight of component (iii).

9. The method of claim 8, wherein (vi) comprises organic oligomers derived from one or more of methyl methacrylate, a diol diacrylate, and a diol dimethacrylate.

10. The method of claim 3, wherein the hybrid material comprises from 0.1% to 30% by weight of component (iii).

11. The method of claim 10, wherein the hybrid material comprises from 1% to 20% by weight of component (iii).

12. The method of claim 3, wherein the hybrid material comprises up to 5% by weight of at least one substance selected from thermal and/or photochemical polymerization or crosslinking initiators.

13. The method of claim 1, wherein the at least one group which is at least one of photochemically and thermally polymerizable is selected from C=C double bonds, hydroxyl, epoxy and amino groups.

14. The method of claim 1, wherein the at least one group comprises at least one photochemically polymerizable group.

15. The method of claim 1, wherein (i) comprises one or more of a polymethacrylate, a polyepoxide, polyvinyl acetate, polyvinyl butyral, and polyacrylamide.

16. The method of claim 15, wherein (i) comprises polyvinyl acetate.

17. The method of claim 1, wherein (c) is carried out at a temperature of from 30 to 90° C.

18. The method of clam 17, wherein (c) is carried out at a temperature of from 50 to 70° C.

19. The method of claim 1, wherein the hybrid material is applied to a transparent polymeric film and, if desired, a transparent liner film is laminated onto the undried or dried hybrid layer.

20. The method of claim 1, wherein a refractive index gradient is produced in the hybrid material perpendicularly to the direction of irradiation.

21. The method of claim 1, wherein local irradiation of the hybrid material produces a refractive index gradient perpendicularly to the direction of irradiation.

22. The method of claim 1, further comprising delaminating a substantially completely cured hybrid layer from the substrate to afford the hybrid layer in the form of a film or sheet.

23. An optical component obtained by the method of claim 1.

24. The optical component of claim 23, which is present as a coated substrate or a molding.

25. The optical component of claim 23, which is present as a film.

26. The optical component of claim 25, which is present as a refractive index gradient film.

27. The optical component of claim 26, wherein the refractive index gradient film comprises or substantially consists of one or more transparent polymeric films coated with a hybrid material which comprises a refractive index gradient.

28. The optical component of claim 23, which comprises a transparent or translucent hybrid layer with refractive index gradients.

29. An imaging optical element which comprises the optical component of claim 23.

30. A light-guiding optical component which comprises the optical component of claim 23.

31. A holographic data storage which comprises the optical component of claim 23.

32. The method of claim 1, wherein the central metal comprises at least Ti.

33. The method of claim 1, wherein the central metal comprises at least Zr.

34. The method of claim 1, wherein the central metal comprises at least Ta.

* * * * *